No. 829,508. PATENTED AUG. 28, 1906
R. K. CRONKHITE & W. C. OFFER.
STONE QUARRYING MACHINE.
APPLICATION FILED OCT. 8, 1904.

7 SHEETS—SHEET 3.

WITNESSES:
W. S. Cathcart
A. A. Easterly

INVENTORS
Roy K. Cronkhite
William C. Offer
BY
Geo. B. Willcox ATTORNEY

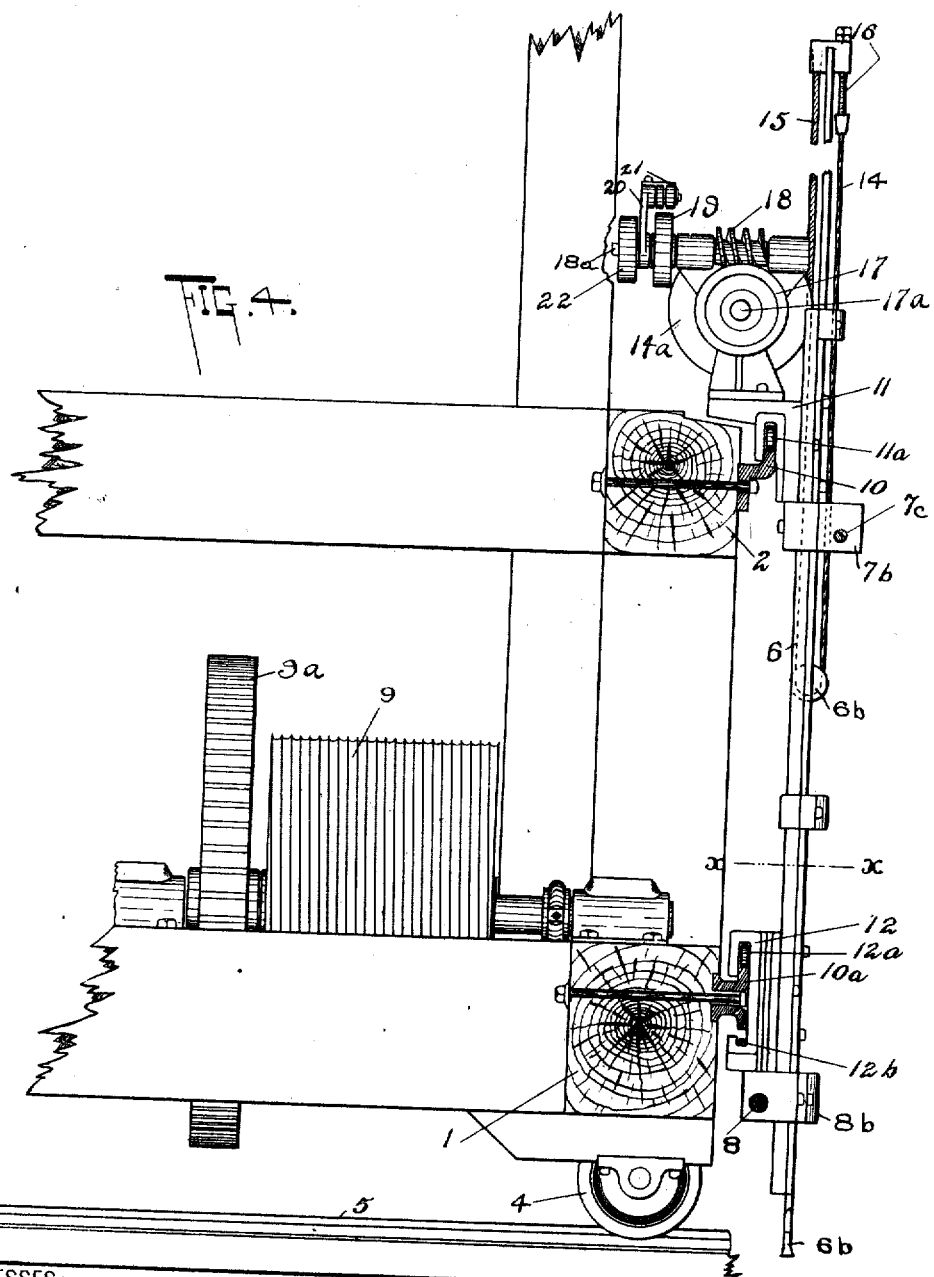

No. 829,508. PATENTED AUG. 28, 1906.
R. K. CRONKHITE & W. C. OFFER.
STONE QUARRYING MACHINE.
APPLICATION FILED OCT. 8, 1904.
7 SHEETS—SHEET 5.
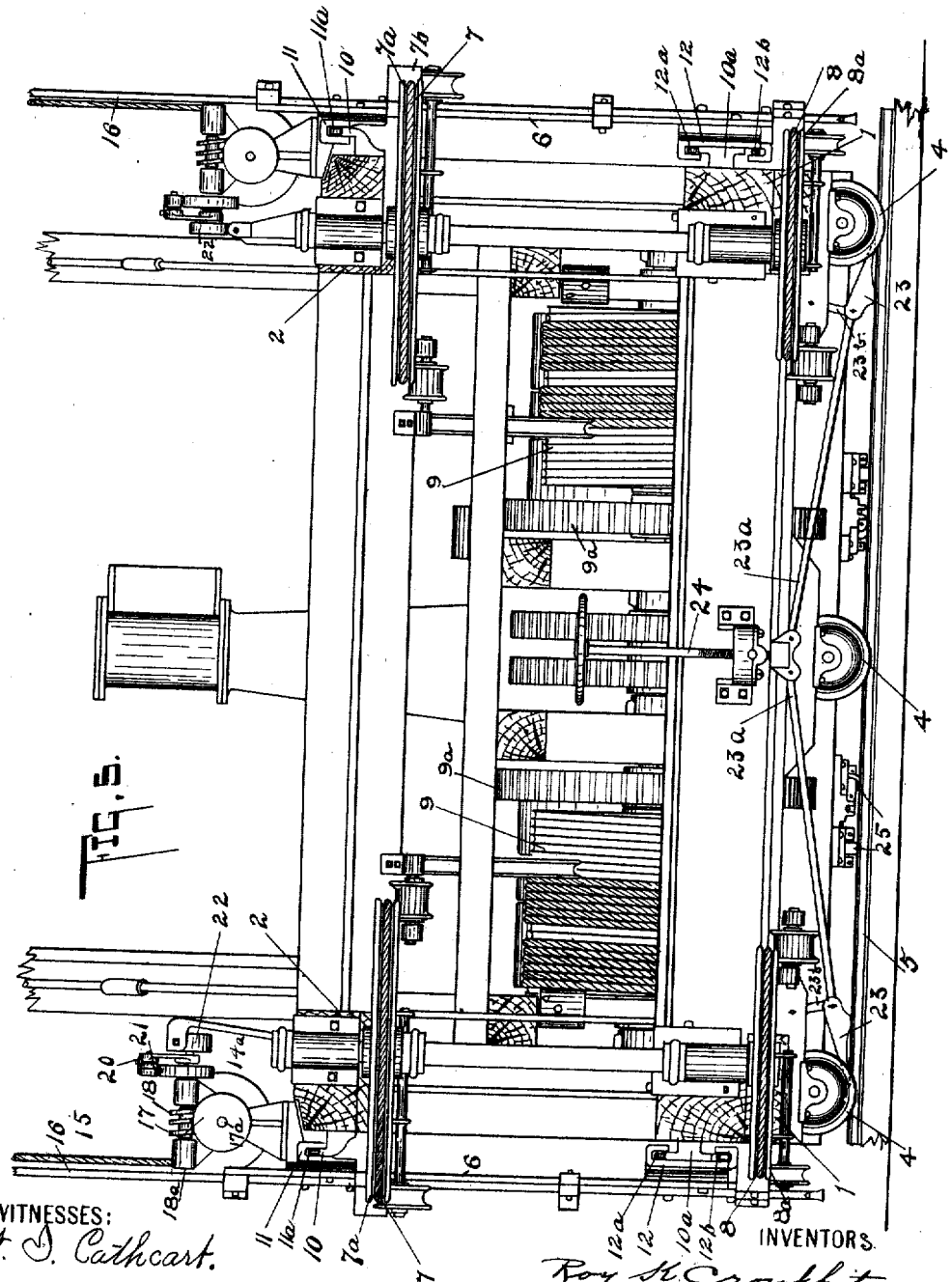

No. 829,508. PATENTED AUG. 28, 1906.
R. K. CRONKHITE & W. C. OFFER.
STONE QUARRYING MACHINE.
APPLICATION FILED OCT. 8, 1904.
7 SHEETS—SHEET 6.
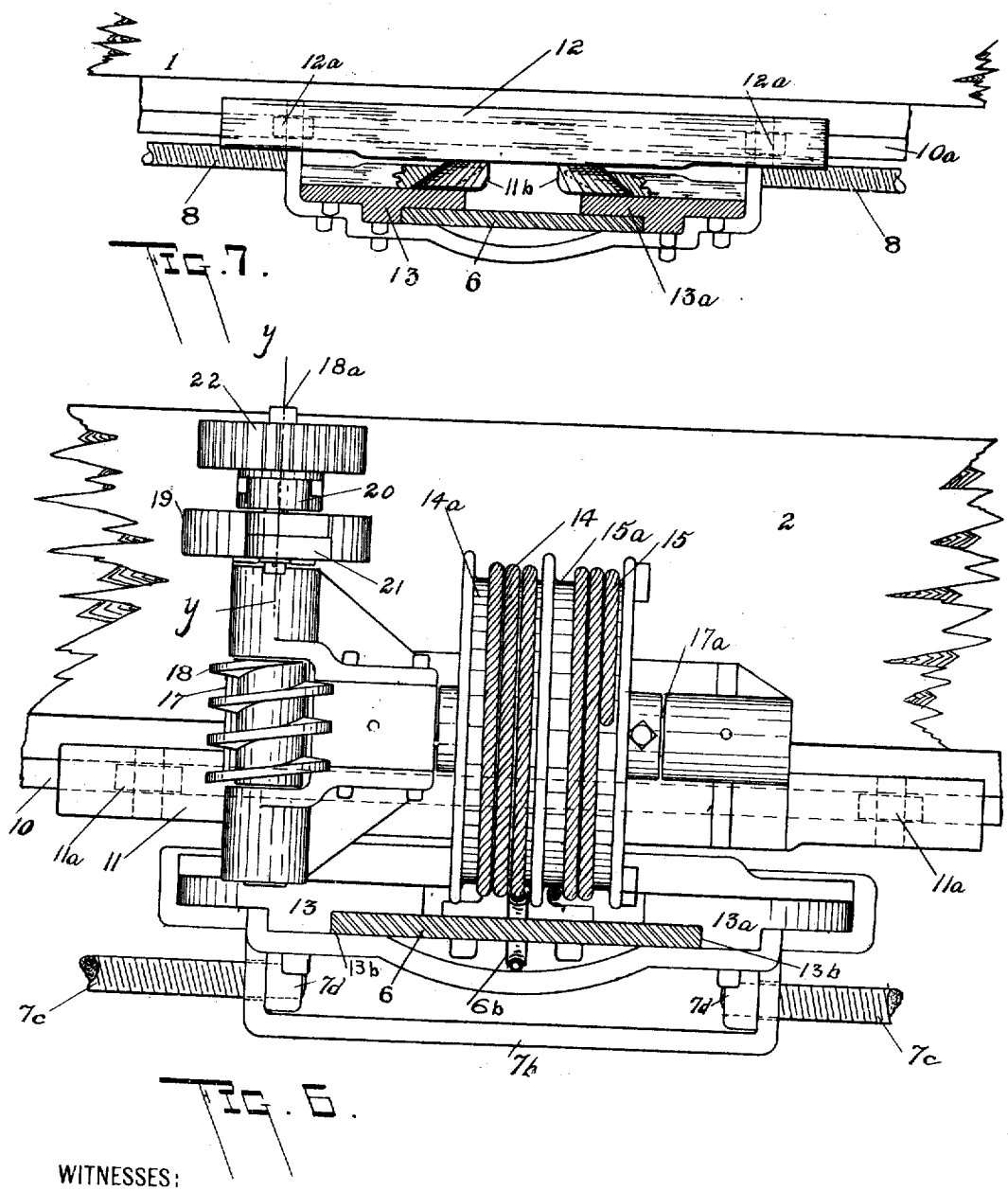
WITNESSES:
W. J. Cathcart.
A. A. Easterly
INVENTORS
Roy K. Cronkhite
William C. Offer
BY
Geo. B. Willcox ATTORNEY No. 829,508.
PATENTED AUG. 28, 1906.
R. K. CRONKHITE & W. C. OFFER.
STONE QUARRYING MACHINE.
APPLICATION FILED OCT. 8, 1904.
7 SHEETS—SHEET 7.
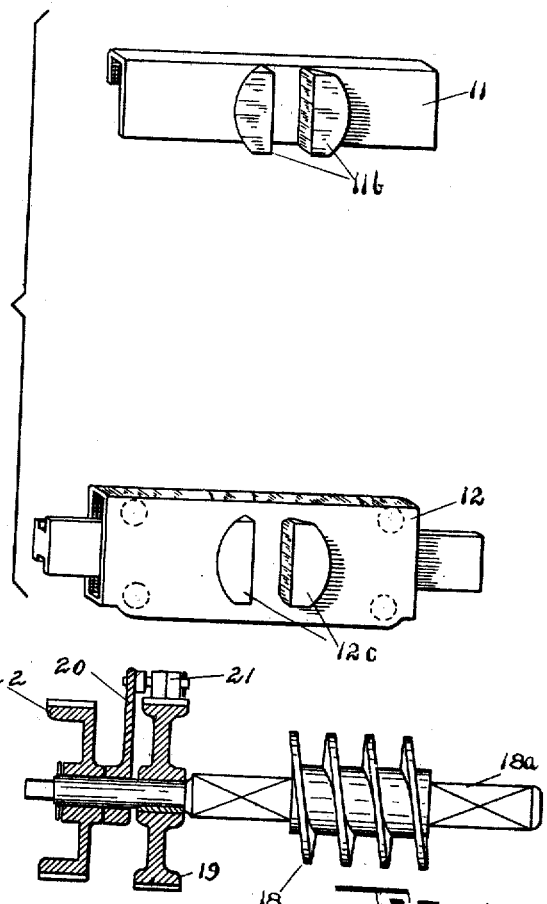
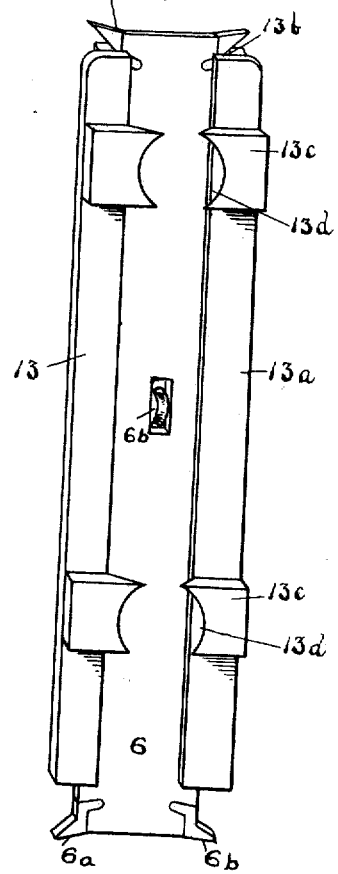

UNITED STATES PATENT OFFICE.

ROY K. CRONKHITE, OF BAY CITY, MICHIGAN, AND WILLIAM C. OFFER, OF MIAMI, FLORIDA.

STONE-QUARRYING MACHINE.

No. 829,508.  Specification of Letters Patent.  Patented Aug. 28, 1906.

Application filed October 8, 1904. Serial No. 227,656.

*To all whom it may concern:*

Be it known that we, ROY K. CRONKHITE, a citizen of the United States, residing at Bay City, Bay county, Michigan, and WILLIAM C. OFFER, a subject of the King of Great Britain, residing at Miami, Dade county, Florida, have invented certain new and useful Improvements in Stone-Quarrying Machines; and we do hereby declare the following to be a full, clear, and exact description of the invention, such as will enable others skilled in the art to which it appertains to make and use the same.

This invention is a stone-quarrying machine especially adapted to cut long blocks or slabs of stone from a quarry-bed; and the improvements consist in the mechanisms, their combination, and the equivalents thereof as will be more fully set forth in the specification and pointed out in the claims of this application.

The invention is illustrated in the accompanying drawings, in which—

Figure 1:
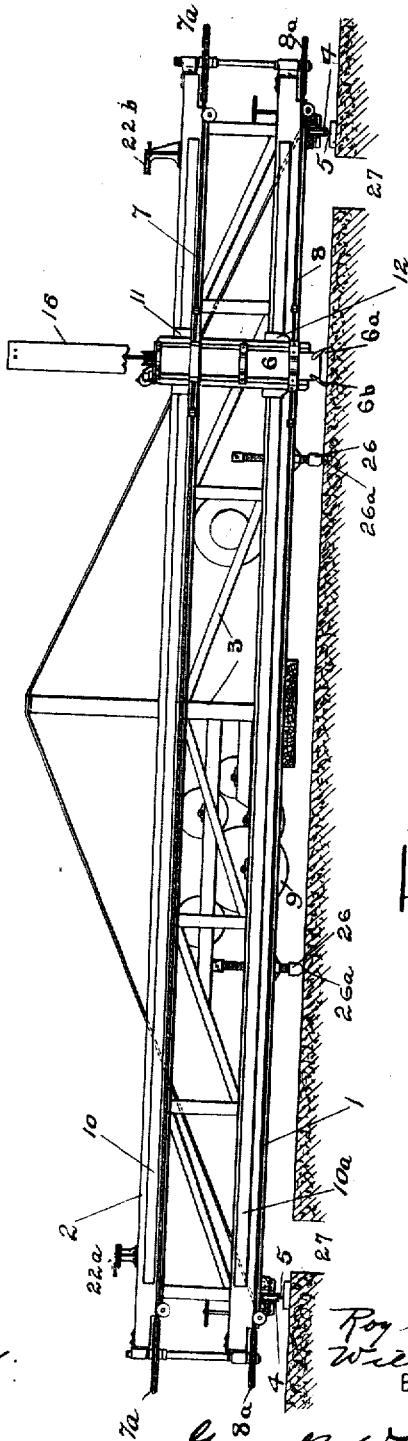
Figure 2:
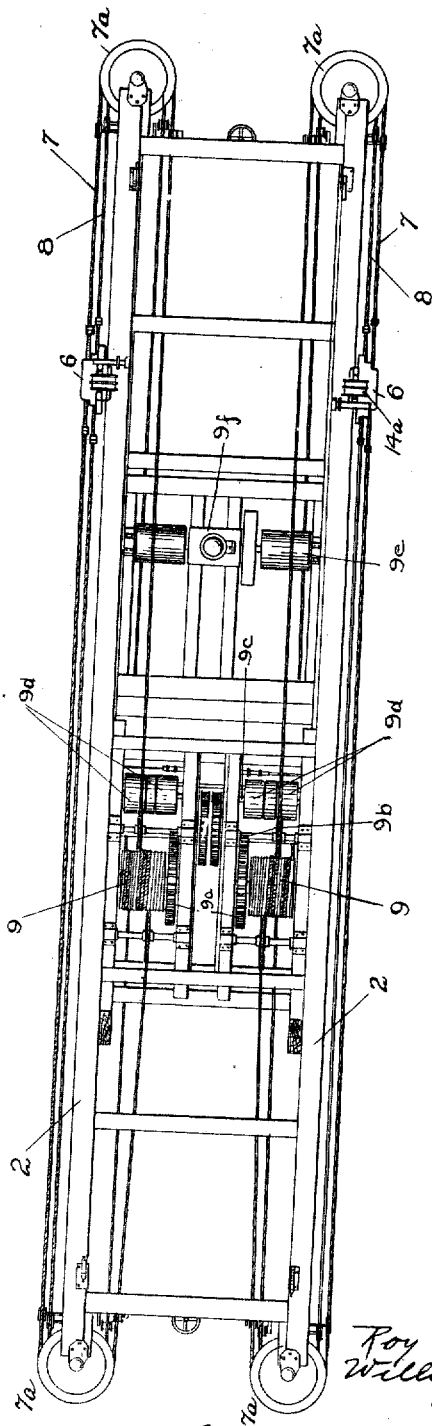
Figure 3:
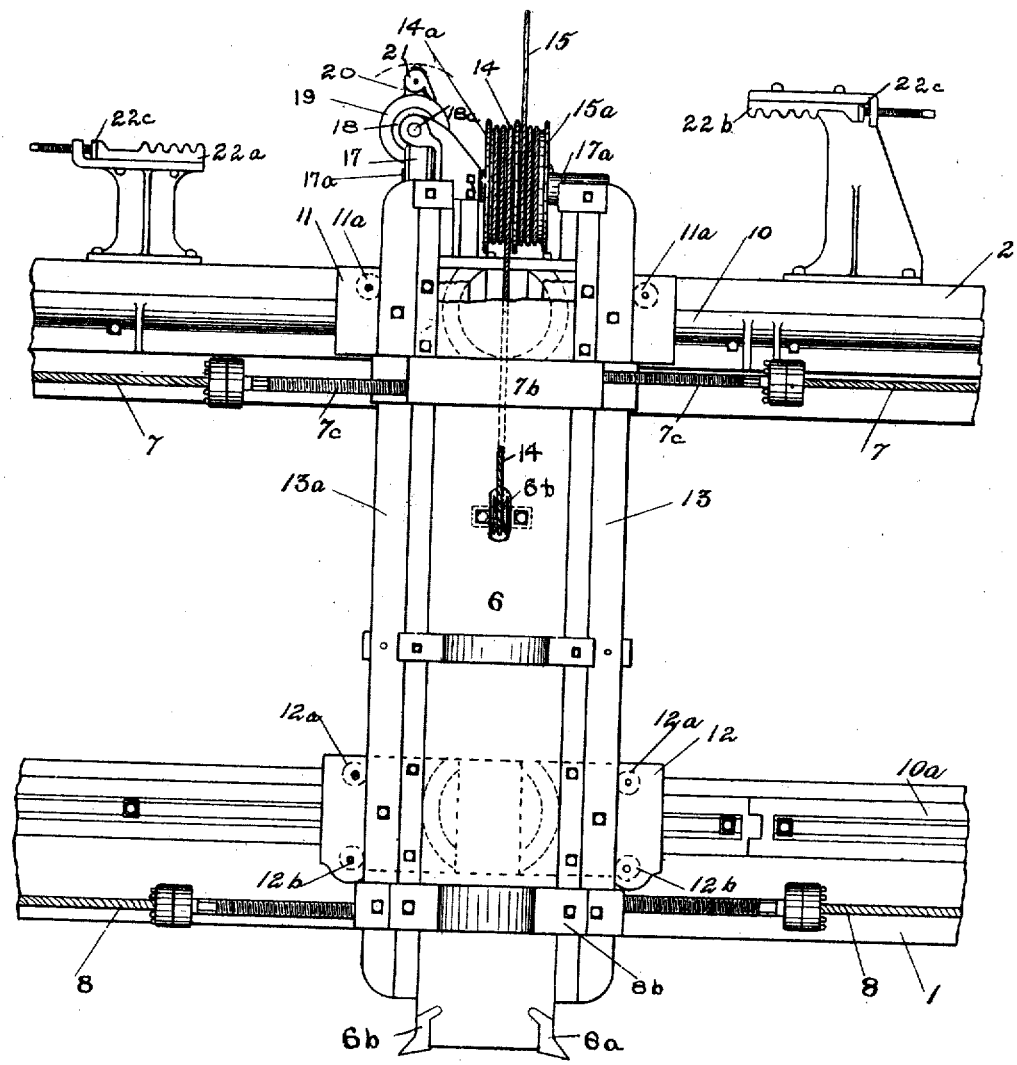

Figure 1 is a front elevation of the machine. Fig. 2 is a top view. Fig. 3 is a front view of the cutter-head and guides. Fig. 4 is a side view of the cutter-head. Fig. 5 is an end view of the machine. Fig. 6 is a top view, partly in section, of the cutter-head and the device for raising and lowering it. Fig. 7 is a horizontal section of the head and its guides, taken on the line $x\,x$ of Fig. 4. Fig. 8 is a perspective view of the upper and lower movable cutter-head brackets. Fig. 9 is a rear view of the cutter-head guides. Fig. 10 is a longitudinal section on the line $y\,y$, Fig. 6, showing the ratchet mechanism for operating the cutter-feed.

The general arrangement of the machine is as follows: A long horizontal guide is mounted above the quarry-floor from which the slab is to be cut. This guide, which consists in a suitably-trussed frame, carries a downwardly-projecting channeling or cutting tool, which moves back and forth lengthwise the frame, being actuated by power-driven mechanisms carried by the frame. The construction of the machine adapts it to cut when traveling in either direction, and it may be described as a double-cutting machine capable of cutting two channels simultaneously. Means is also provided for automatically lowering the tool at the end of each cut, thus giving the necessary feed for the next cut.

In the specification we shall consider the device as if it were a single-cutting machine, it being understood that the cutters and their driving mechanisms are simply duplicated in the double-cutting machine.

The guide-frame consists in a lower horizontal beam 1 and an upper horizontal beam 2, connected by any suitable system of braces 3 to form a trussed frame. The lower beam 1 is provided near its ends with suitable wheels 4, adapted to travel on rails 5, fixed to the quarry-bed and lying at right angles to the direction of the cut.

The cutter-head 6 is traversed back and forth lengthwise the guide-frame, as described, the actuating means consisting in a pair of continuous flexible cables 7 and 8, passing over idler-pulleys $7^a$ and $8^a$, located at the ends of the guide-frame. The intermediate portions of the cables pass around a driving-drum 9, carried by the frame of the machine and actuated by any suitable means, such as an engine connected by belts or gears to the drum.

Rotation of the drum in one direction moves the cutter-head lengthwise the guides, and rotating the drum in the opposite direction reverses the travel of the cutter-head. At the end of its travel the cutting-tool is moved downward a short distance to give the required feed for the next cut by means which will be described later.

We prefer to mount the cutter-head 6 on the beams 1 and 2 by the means illustrated in Figs. 3, 4, and 6, where 10 is a flanged rail or track secured to and extending lengthwise the upper beam 2, and $10^a$ is a double-flanged rail secured to the lower beam 1. Upon the upper rail 10 rides a bracket 11, on which are mounted guides for the vertically-slidable cutter-head 6. The bracket 11 is provided with wheels $11^a$, whereby it may be rolled lengthwise along the track 10. Upon the lower rail $10^a$ is mounted a bracket 12, adapted to receive the guides of the vertically-slidable cutter-head 6 and provided with wheels $12^a$, adapted to roll on the upper flange of the track $10^a$, also a pair of wheels $12^b$, adapted to ride upon the lower flange of the track $10^a$ to take the reaction or upward thrust of the tool when making the cut.

We connect the upper bracket 11 to the lower bracket 12 by securing to them a pair of vertical guides 13 and $13^a$, provided with suitable ways 13$^b$, in which the cutter-head 6 may slide up and down. The upper cable 7 is secured to the upper part of the guides 13 and 13$^a$ by means of a yoke 7$^b$. (Shown in Figs. 3, 4, and 6.) The cable is secured to the yoke 7$^b$ by means of threaded bolts 7$^c$, (shown in Figs. 3 and 6,) fixed at one end to the cable 7 and provided at their opposite ends with nuts 7$^d$, engaging the yoke 7$^b$ and adapted to be tightened to adjust the tension of the cable. The lower cable 8 is similarly secured to the yoke 8$^b$, which is attached to the lower part of the guides 13 and 13$^a$. It is thus seen that the pull of the cable acts through the yoke 7$^b$ upon the upper part of the guides 13 and 13$^a$, while the pull of the lower cable is brought by the yoke 8$^b$ upon the lower part of the guides, and it is further seen that the brackets 11 and 12 are relieved of the strain which would otherwise be brought to bear upon them if the cables were attached directly to the brackets. A further advantage attained by this arrangement is that the guides 13 and 13$^a$, instead of being rigidly fixed to the brackets 11 and 12, may be pivotally mounted thereon to permit the cutter-head 6 to deviate slightly from the vertical when the cutting-tool encounters an unusually hard piece of rock, which might bring serious strain upon the brackets 11 and 12 or bind the wheels on the tracks, if the guides 13 and 13$^a$ were fixed to the brackets. The elastic tension of the cables is sufficient to permit the cutter-head to deflect the required amount. The details of the pivotal connections between the upper bracket 11 and the upper part of the guides and between the lower bracket 12 and the lower part of the guides are illustrated in Figs. 8 and 9.

The bracket 11 carries an undercut connection in the form of a dovetailed projection 11$^b$. (Illustrated in Figs. 7 and 8.) A similar projection 12$^c$ is provided on the lower bracket 12. Fixed to the rear face of the guides 13 and 13$^a$ are plates 13$^c$, having beveled recesses 13$^d$, adapted to engage the projections 11$^b$ and 12$^c$ in such a manner that the guides are supported by the projections while permitting small lateral movement of the brackets 11 and 12 relatively to each other. The cutter-head 6 is vertically slidable in the grooves 13$^b$ of the guides, and its movement is independent of the connections 11$^b$ and 12$^c$.

The lower end of the cutter-head 6 carries inserted cutting-teeth 6$^a$ and 6$^b$, which may be replaced when worn. We also prefer to provide similar teeth at the upper end of the cutter-head, so that the cutter-head when its lower end becomes worn thin may be turned end for end to bring the upper teeth into use.

The up-and-down movement of the cutter-head 6 is controlled by means of a rope or cable 14, Fig. 3, which is fixed at one end to a drum 14$^a$, upon which it is wound two or three times, and thence passes down back of the cutter-head 6 and under the grooved pulley 6$^b$, revolubly mounted in the cutter-head 6, and thence up in front of the cutter-head 6 to its upper end, as shown in Fig. 4, where the cable is secured, by means of a threaded bolt 16 or other suitable device, to the upper end of the cutter-carrier 6, whereby the tension in the cable 14 may be adjusted. Upon the same shaft 17$^a$ to which the drum 14$^a$ is keyed is mounted a second drum 15$^a$, upon which a second cable 15 is wound and to which the end of the cable 15 is attached. The cable 15 is wound opposite that of the cable 14 and passes up from the drum back of the cutter-head 6 and is attached to its upper end, as shown in Fig. 4.

It is evident that revolving the drums 14$^a$ and 15$^a$ will wind up cable 14 and unwind cable 15 simultaneously, thereby raising the cutter-head 6. By reversing the movement of the drums the cutter-head may be lowered.

Only a small amount of vertical movement or feed should be imparted to the cutter-head, and we therefore produce the required slight movement of the drums 14$^a$ and 15$^a$ by fixing a worm-wheel 17 to the shaft 17$^a$ of the drums and provide a worm 18, meshing with the worm-wheel 17 and operated by the means illustrated in Figs. 3, 4, 6, and 10. The worm 18 is fixed to its shaft 18$^a$, as is also the ratchet-wheel 19. Loosely mounted on the same shaft is a pawl-arm 20, carrying pawls 21 to engage the ratchet-wheel. Fixed to the pawl-arm and revolubly mounted on the shaft 18$^a$ is a gear-wheel 22, to which intermittent motion is imparted at the end of the horizontal travel of the cutter-head by a toothed rack 22$^a$, located near one end of the trussed frame and adapted to engage the under side of the gear-wheel 22. A similar rack 22$^b$ is located at the other end of the trussed frame, so as to engage the top of the gear when the cutter-head reaches the other extremity of its travel. The racks 22$^a$ and 22$^b$ are carried by standards of any suitable form, being preferably mounted on the standards in such a manner as to be capable of slight longitudinal movement. The backward movement of the rack is limited by a rubber cushion 22$^c$, which yields slightly when the gear 22 contacts with the rack to bring the teeth of the rack and gear properly into mesh. The standards are also provided with suitable means for adjusting the positions of the racks whereby to adjust the amount of feed of the cutters.

To drive the upper cable 7 and the lower cable 8 simultaneously and at exactly the same speed, it is advisable to wind both cables on the same driving-drum, and in order to do this it is necessary to have them wind on the drum in different planes, so as not to overlap each other. We prefer to make the upper cable-wheels 7ª of larger diameter than the lower cable-wheels 8ª, thus keeping the winding part of the upper cable out of the vertical plane of the winding part of the lower cable. Fixed to the shaft of the driving-drum 9 is a gear 9ª, which meshes with a pinion 9ᵇ, and by suitable intermediate gearing is driven by the shaft 9ᶜ, on which are mounted driving-pulleys 9ᵈ, belted to the pulley 9ᵉ of an engine 9ᶠ or other suitable source of power.

To prevent forward or backward movement of the machine on the tracks 5 while the machine is at work, we employ means for rigidly locking the wheels 4 against rotation. The locking means consists in a pair of wedges 23, Fig. 5, adapted to be forced between the rail and the tread of the wheels by means of a pair of thrust members 23ª, pivotally connected at their ends to form a toggle-joint which may be forced downward by a suitably-mounted screw 24. Links 23ᵇ, suspended from the frame of the machine, carry the upper ends of the wedges 23 and the lower ends of the thrust members 23ª.

The entire machine may be swung through any angle by means of rollers 25, arranged in a circle midway the length of the frame to form a turn-table when the weight of the machine is rested upon them. In practice a suitable temporary platform is provided beneath the rollers 25 for them to roll on when it is desired to swing the machine.

Suitable jack-screws 26, carried by the frame and having pointed ends 26ª, are adapted to be screwed down to take part of the weight of the trussed frame and to prevent it swinging while the cutters are in operation. They are also used to lift the entire machine when putting the removable platform in place beneath the rollers.

The operation of the machine is as follows: An opening or channel 27 is first cut in the bed of the quarry and the tracks 5 laid outside these channels. The machine is then moved along the track 5 until the proper place for commencing the cut is reached. The jack-screws 26 are then let down until the weight of the machine is partially carried by them, and the truss is leveled so the guide-beams 1 and 2 are straight, or nearly so. The cutter-head 6 is then moved over one of the openings 27, and the cutting-teeth are lowered until they are in position to cut the proper depth, the depth of the cut varying with the hardness of the rock. The motive power is then applied, and the cutter-head travels along the guides until the other opening 27, which may be at the opposite side of the frame, is reached. Here the gear 22 engages the stationary rack 22ª and moves the pawl 21 back a short distance on the ratchet-wheel 19. The end of the travel of the cutter-head 6 being reached, its motion is reversed by the reversing of the motion of the drums 9 without reversing the engine. This may be accomplished by any suitable means, as by using a straight belt and a crossed belt between the engine-pulley 9ᵉ and the driven pulleys 9ᵈ. The pulleys 9ᵈ are preferably two pulleys keyed to their shaft with a loose pulley between them. A properly-connected belt-shifter may be employed to shift both belts simultaneously when the cutter reaches the end of its travel. This arrangement is commonly used for such purposes. One of the belts is always on the loose pulley and the other is always driving. As soon as the cutter-head 6 commences its return stroke the gear 22 rolls off the rack 22ª and in so doing swings the pawl-arm 20 forward, thereby turning the ratchet-wheel 19, the worm 18, worm-wheel 17, drums 14ª and 15ª, and lowering the cutter-teeth 6ª and 6ᵇ a proper amount for the next cut. At the end of the next stroke the rack 22ᵇ operates to lower the cutter-head the same amount.

We have not illustrated in detail the levers or mechanisms by which the belts or their shifter may be operated, as any of the well-known devices suitable for the purpose may be employed without departing from the spirit of our invention.

What we claim as our invention, and desire to secure by Letters Patent, is as follows:

1. In a quarrying-machine, the combination with a trussed frame comprising an upper and a lower horizontal guide member and suitable braces connecting said members; of horizontal tracks carried by said guide members; brackets riding on said tracks; vertical guides connecting said brackets, said guides being pivotally mounted at their upper ends on the upper bracket and pivotally mounted at their lower ends on the lower bracket; a vertically-movable cutter-head carried by said guides; and means for traversing said cutter-head back and forth along the guide-frame.

2. In a quarrying-machine, the combination with a trussed frame comprising an upper and a lower horizontal guide member and suitable braces connecting said members; of horizontal tracks carried by said members; brackets riding on said tracks; vertical guides connecting said brackets, said guides being pivotally mounted at their upper ends on the upper bracket and pivotally mounted at their lower ends on the lower bracket; a vertically-movable cutter-head carried by said guides; means carried by the upper bracket for imparting slight vertical movement to said cutter-head; and means for traversing said cutter-head back and forth along the guide-frame.

3. In a quarrying-machine of the class described, the combination with the upper and lower brackets carried by the frame of the machine, of vertical guides pivotally mounted near their upper ends to the upper bracket and near their lower ends to the lower bracket; and a vertically-movable cutter-head carried by said guides, substantially as described.

4. A feeding device for quarrying-machines comprising traveling guides, a cutter-head movably mounted in the guides, a drum adapted to travel with the guides, a plurality of cables, one end of each cable being secured to the drum, the opposite end of one cable extending downward and being loosely connected to the head at a point intermediate its ends, thence extending upward and secured to the upper end of the cutter-head, the opposite end of the remaining cable extending directly to the upper end of the cutter-head to which it is secured and means for imparting movement to the drum to raise or lower the cutter-head.

5. A feeding device comprising a traveling guide, a cutter-head movably mounted on the guide, a drum adapted to travel with the guide, lifting and lowering cables on the drum, one end of the lifting-cable loosely engaging the cutter-head at a point intermediate its ends and thence passing to the upper end of the cutter-head where it is secured, one end of the lowering-cable extending directly and secured to the upper end of the cutter-head, a worm-gearing for actuating the drum, a ratchet-wheel connected to the worm-gearing, a gear-wheel for actuating the worm-gearing, a pawl carried by the gear-wheel and engaging the ratchet-wheel and stationary racks extending into the path of travel of the guides and adapted to be engaged by the gear-wheel.

6. A feeding device comprising a movable cutter-head, a drum located adjacent thereto, a lifting-cable secured to the head, and wound upon the drum, a lowering-cable secured to the head and wound upon the drum in the opposite direction, and means for rotating the drum in one direction or the other to raise or lower the cutter-head.

7. A feeding device comprising a traveling adjustable cutter-head, a drum, means oppositely wound on the drum and secured to the cutter-head to raise and lower the same, worm-gearing for rotating the drum in either direction, a pawl-and-ratchet mechanism for rotating the worm-gearing and a rack with which the mechanism is brought into contact at the limit of travel of the cutter-head in either direction for actuating the pawl-and-ratchet mechanism.

8. A feeding device for quarrying-machines comprising traveling guides, a cutter-head movably mounted in said guides, a drum traveling with the guides, flexible means oppositely wound on the drum and secured to the cutter-head to raise and lower the latter, worm-gearing for actuating the drum, a ratchet-wheel connected to the worm-gearing, a loosely-mounted gear-wheel traveling with the drum, a pawl carried by the gear-wheel and adapted to engage the ratchet-wheel and oppositely-located stationary racks adapted to engage the upper and lower sides of the gear-wheel respectively.

9. A quarrying-machine comprising a suitable frame, guide means carried thereby, cutting mechanism mounted and adapted to travel upon the guide means, shafts journaled at opposite ends of the frame, wheels of different sizes secured to the shafts, a suitably-driven drum, flexible connections passing around the wheels and engaging different portions of the drum, the opposite ends of the respective flexible connections being secured to the cutting mechanism the difference in size of the wheels preventing an overlapping of the connections on the drum.

10. A quarrying-machine comprising a suitable frame, cutting mechanism carried by the frame, the mechanism comprising suitable brackets engaging and adapted to travel relative to the frame, guides, a connection carried by each of said brackets, recessed plates rigidly secured to the guides and engaging the connection, a cutter-head mounted in the guides and carrying cutters, and means for actuating the cutting mechanism.

11. A quarrying-machine comprising a frame, brackets traversing the frame, semi-cylindrical projections carried by the brackets, the projections spaced apart from each other, a cutter-head, guides spaced apart to receive the cutter-head, and recessed plates secured on the guides and engaging the projections, to connect the guides and brackets.

12. A quarrying-machine comprising a frame, brackets traveling on the frame and spaced apart from each other, guides yieldingly connected to each of the brackets, a cutter-head received in the guides, and cutters carried by the head, the cutting action of the cutters being in a plane parallel and coincident with the movement of the brackets.

13. A quarrying-machine comprising a frame, parallel rails thereon, a cutter-head and cutters, guides in which the cutter-head is received, the guides adapted to travel relative to and yieldingly connected with each of the rails, the cutter-head adapted to yield in the plane of its movement when encountering an obstacle.

14. In a quarrying-machine, the combination with a suitable frame and track members carried thereby, of a cutting mechanism comprising brackets mounted on the track members, sectional undercut connections carried by the brackets, a cutter-head and cutters, guides for the cutter-head, said guides each provided with beveled plates engaging the sections of the connections and means for actuating the cutting mechanism.

15. The combination with a quarrying-machine of a cutter mechanism adapted to travel relative to the machine, said mechanism comprising a suitably-guided cutter-head, an antifriction member mounted in the head, a plurality of drums carried by said cutting mechanism, flexible cables wound in opposite directions about the respective drums, one end of each cable secured to its drum, the opposite end of one cable passing down around the antifriction member and thence to the upper end of the head, to support and raise the head, the opposite end of the remaining cable extending directly to the upper end of the head for lowering the same and means for actuating the drums.

16. A quarrying-machine comprising a support, a cutting mechanism adapted to travel longitudinally of the support, and means for automatically actuating said cutting mechanism toward and from the work, said means comprising a drum traveling with the cutting mechanism, separate flexible connections secured to the cutting mechanism and reversely wound relative to each other upon the drum, to move the cutting mechanism toward and away from its work, and means for automatically effecting the rotation of the drum.

17. A quarrying-machine consisting of a cutting mechanism, means for feeding said cutting mechanism longitudinally toward and from the work, said feeding means consisting of a raising and a lowering connection secured to the cutting mechanism, a rotatable member about which the connections are oppositely wound, means for laterally reciprocating the cutting mechanism, operating means adapted to rotate the rotatable member and stationary means with which the operating means is brought into engagement to cause the actuation of the feeding mechanism.

18. The combination in a quarrying-machine, with cutting mechanism and means for reciprocating the cutting mechanism relative to the machine, of feeding mechanism connected with the cutting mechanism, said feeding mechanism comprising a rotatable member and means connecting the cutting mechanism and member, a worm and gear for actuating the rotatable member, a ratchet mechanism for actuating the worm, a gear connected with the ratchet mechanism, and an adjustable rack with which the gear is brought into contact to actuate the ratchet mechanism.

19. The combination in a quarrying-machine with cutting mechanism and means for actuating the same relative to the machine, of feeding mechanism connected with the cutting mechanism, a gear connected with the feeding mechanism and an adjustable rack with which the gear is brought into contact.

20. In a quarrying-machine, the combination with a cutting mechanism and means for actuating the same relative to the machine, of feeding mechanism connected to the cutting mechanism, a gear connected with the feeding mechanism, a suitably-supported rack adapted to engage the gear, and means for cushioning the engagement of the gear and rack, to cause the teeth to mesh.

21. A quarrying-machine comprising a frame, a cutter-head, and means for feeding the cutter-head longitudinally toward and from the work, said means comprising a drum, means for imparting a step-by-step rotation to the drum, an antifriction member carried by the cutter-head intermediate its ends, a flexible connection wound on the drum and passing around the antifriction member and thence secured to one end of the cutter-head, and a second flexible connection wound upon the drum in a reverse direction, and also secured to the cutter-head.

22. A quarrying-machine comprising a cutting mechanism consisting of a cutter-head, a drum, means for rotating the drum, flexible connections oppositely wound on the drum and secured to the cutter-head to move the cutter-head longitudinally of itself, in opposite directions.

In testimony whereof we affix our signatures in the presence of two witnesses.

ROY K. CRONKHITE.
WM. C. OFFER.

Witnesses for R. K. Cronkhite:
  W. I. CATHCART,
  J. S. SEE.

Witnesses for W. C. Offer:
  F. G. RAILEY, Jr.,
  ANNA M. PECK.